(12) United States Patent
Savulak et al.

(10) Patent No.: US 11,611,241 B2
(45) Date of Patent: Mar. 21, 2023

(54) WIRELESS POWER TRANSFER TO AN EXTRAVEHICULAR MOBILITY UNIT

(71) Applicant: Hamilton Sundstrand Corporation, Charlotte, NC (US)

(72) Inventors: Stephen Savulak, Woodbury, CT (US); Sean K. Murray, Enfield, CT (US); Gregory John Quinn, Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 71 days.

(21) Appl. No.: 17/322,284

(22) Filed: May 17, 2021

(65) Prior Publication Data

US 2022/0368158 A1 Nov. 17, 2022

(51) Int. Cl.
*H02J 50/12* (2016.01)
*B64G 6/00* (2006.01)

(52) U.S. Cl.
CPC ............... *H02J 50/12* (2016.02); *B64G 6/00* (2013.01)

(58) Field of Classification Search
CPC . H02J 50/00; H02J 50/10; H02J 50/12; B64G 6/00
See application file for complete search history.

(56) References Cited

U.S. PATENT DOCUMENTS

| 9,126,514 B2 * | 9/2015 | Soar ....................... H02J 50/90 |
| 9,878,787 B2 | 1/2018 | Chan et al. |
| 9,912,174 B2 | 3/2018 | Soar |
| 10,298,060 B2 | 5/2019 | Wright |
| 2006/0281435 A1 * | 12/2006 | Shearer ................. H02J 50/001 455/343.1 |
| 2010/0090866 A1 * | 4/2010 | Chen ....................... B64G 6/00 340/953 |
| 2011/0089894 A1 * | 4/2011 | Soar ....................... B60N 2/90 320/108 |
| 2011/0278943 A1 | 11/2011 | Eckhoff et al. |
| 2013/0005251 A1 * | 1/2013 | Soar ....................... H02J 50/10 307/9.1 |
| 2014/0015336 A1 * | 1/2014 | Weber ................... H02J 7/0047 307/104 |
| 2015/0210367 A1 * | 7/2015 | Castellanet ............. H05K 5/06 361/679.01 |
| 2016/0011418 A1 * | 1/2016 | Dopilka ................. G06F 3/013 345/8 |
| 2017/0179750 A1 * | 6/2017 | Oo ......................... H02J 7/342 |
| 2017/0256963 A1 * | 9/2017 | Murray ............... H02J 7/00712 |
| 2017/0279292 A1 * | 9/2017 | Shirani-Mehr ......... H02J 50/10 |
| 2018/0076664 A1 * | 3/2018 | Wright .................. B64G 1/428 |

(Continued)

OTHER PUBLICATIONS

Search Report issued in European Patent Application No. 22168508.4; Application Filing Date Apr. 14, 2022; dated Sep. 29, 2022 (8 pages).

*Primary Examiner* — Rexford N Barnie
*Assistant Examiner* — Joseph N Inge
(74) *Attorney, Agent, or Firm* — Cantor Colburn LLP

(57) ABSTRACT

An extravehicular mobility unit (EMU) includes a resonant coil on a surface of the EMU to be coupled to a second resonant coil affixed to a structure via a resonant magnetic field. The EMU also includes a receiver in the EMU coupled to the resonant coil to provide a direct current (DC) voltage based on the resonant magnetic field. A battery in the EMU is charged based on the DC voltage.

10 Claims, 4 Drawing Sheets

(56) References Cited

U.S. PATENT DOCUMENTS

| | | | |
|---|---|---|---|
| 2019/0133303 A1* | 5/2019 | Thiel | H01M 50/256 |
| 2020/0216132 A1* | 7/2020 | Fuchs | H02J 50/10 |
| 2020/0326537 A1* | 10/2020 | Busey | G02B 27/0101 |
| 2021/0250667 A1* | 8/2021 | Rampone | G01D 21/02 |
| 2021/0351619 A1* | 11/2021 | Nair | H02J 7/04 |

* cited by examiner

WIRELESS POWER TRANSFER TO AN EXTRAVEHICULAR MOBILITY UNIT

BACKGROUND

Exemplary embodiments pertain to the art of power management in space and, in particular, to wireless power transfer to an extravehicular mobility unit (EMU).

In space applications, management of consumables (e.g., air, water) and power presents different challenges than in earth-based applications. When an astronaut is outside the space vehicle (i.e., performing extravehicular activity) on the surface of a planet or performing a spacewalk, for example, a depletion of any consumables or battery capacity may require termination of the extravehicular activity.

BRIEF DESCRIPTION

In one embodiment, an extravehicular mobility unit (EMU) includes a resonant coil on a surface of the EMU to be coupled to a second resonant coil affixed to a structure via a resonant magnetic field and a receiver in the EMU coupled to the resonant coil to provide a direct current (DC) voltage based on the resonant magnetic field. A battery in the EMU is charged based on the DC voltage.

Additionally or alternatively, in this or other embodiments, the EMU also includes a power distribution module coupled to the battery to distribute power to one or more systems in the EMU.

Additionally or alternatively, in this or other embodiments, the one or more systems include a regulator and one or more fans.

Additionally or alternatively, in this or other embodiments, the EMU also includes a controller connected to the receiver to direct the DC voltage from the receiver to the battery or to the power distribution module. The battery supplies the power distribution module based on the controller directing the DC voltage from the receiver to charge the battery.

Additionally or alternatively, in this or other embodiments, the resonant coil is affixed on an outer surface of a primary life support system (PLSS) of the EMU.

Additionally or alternatively, in this or other embodiments, the resonant coil is affixed on a surface of a display and control module (DCM) of the EMU.

In another embodiment, a method of assembling an extravehicular mobility unit (EMU) includes affixing a resonant coil on a surface of the EMU, the resonant coil being coupled to a second resonant coil, which is affixed to a structure, via a resonant magnetic field. The method also includes coupling a receiver in the EMU to the resonant coil so that the receiver provides a direct current (DC) voltage based on the resonant magnetic field. A battery in the EMU is charged based on the DC voltage.

Additionally or alternatively, in this or other embodiments, the method also includes coupling a power distribution module to the battery. The power distribution module distributes power based on the battery to one or more systems in the EMU.

Additionally or alternatively, in this or other embodiments, the one or more systems include a regulator and one or more fans.

Additionally or alternatively, in this or other embodiments, the method also includes arranging a controller to direct the DC voltage from the receiver to the battery or to the power distribution module. The battery supplies the power distribution module based on the controller directing the DC voltage from the receiver to charge the battery.

Additionally or alternatively, in this or other embodiments, the method also includes affixing the resonant coil on an outer surface of a primary life support system (PLSS) of the EMU.

Additionally or alternatively, in this or other embodiments, the method also includes affixing the resonant coil on an outer surface of a display and control module (DCM) of the EMU.

In yet another embodiment, a system for power transfer in space includes a power transfer unit affixed to a structure. The power transfer unit includes a first resonant coil, a transmitter coupled to the first resonant coil, and an extravehicular mobility unit (EMU). The EMU includes a second resonant coil to be coupled to the first resonant coil via a resonant magnetic field, and a receiver coupled to the second resonant coil to provide a direct current (DC) voltage based on the resonant magnetic field. A battery in the EMU is charged based on the DC voltage.

Additionally or alternatively, in this or other embodiments, the EMU further comprises a power distribution module coupled to the battery to distribute power to one or more systems of the EMU.

Additionally or alternatively, in this or other embodiments, the one or more systems include a regulator and one or more fans.

Additionally or alternatively, in this or other embodiments, the EMU further comprises a controller connected to the receiver to direct the DC voltage from the receiver to the battery or to the power distribution module. The battery supplies the power distribution module based on the controller directing the DC voltage from the receiver to charge the battery.

Additionally or alternatively, in this or other embodiments, the structure is in an airlock of a space vehicle, a space station, or a planetary habitat.

Additionally or alternatively, in this or other embodiments, the structure is part of a planetary rover.

Additionally or alternatively, in this or other embodiments, the second resonant coil is on an outer surface of a primary life support system (PLSS) of the EMU.

Additionally or alternatively, in this or other embodiments, the second resonant coil is on an outer surface of a display and control module (DCM) of the EMU.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As previously noted, in space applications, the duration of extravehicular activity may be limited by depletion of consumables or power. According to one prior approach, a battery in the EMU is removed and recharged. This requires that the astronaut wearing the EMU re-enter a space vehicle or habitat to have the life support functions that are provided by the EMU during extravehicular activity. According to another approach, the battery need not be removed but a physical connection must be made between a charger in the spacecraft and the EMU. This requires a perfect electrical connection on all pins to operate. Embodiments of the systems and methods detailed herein relate to wireless power transfer to an EMU. Power transfer to the EMU is facilitated via a resonant magnetic field. Thus, both a physical connection and removal of the battery are avoided.

Figure 1B:
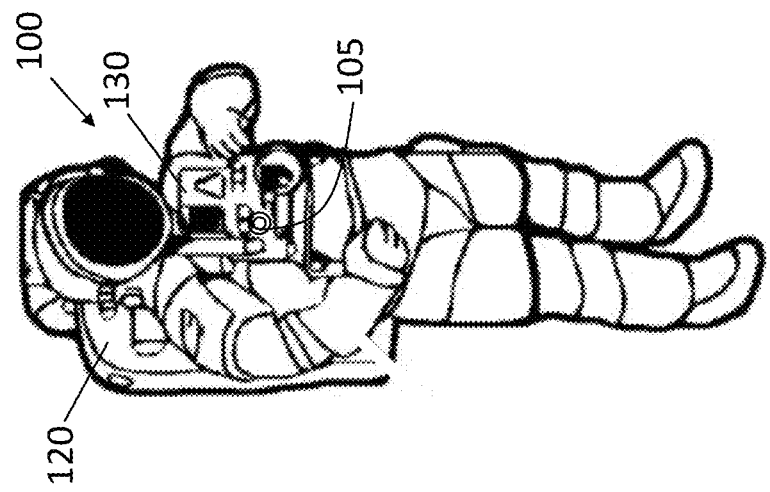
FIG. 1B shows an isometric view of the EMU in FIG. 1A.
Figure 1A:
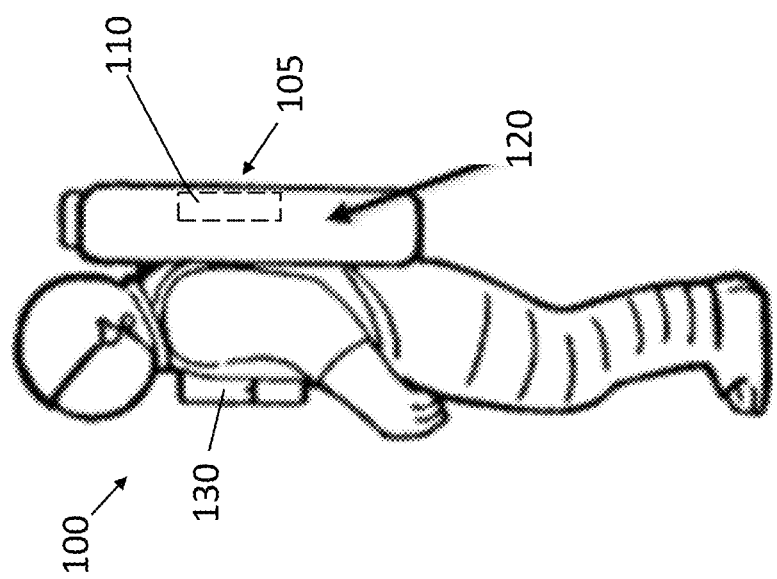
FIG. 1A shows a side view of an extravehicular mobility unit (EMU) to which power is wirelessly transferred according to one or more embodiments.

FIGS. 1A and 1B show different aspects of an EMU 100 to which power is transferred wirelessly according to one or more embodiments. FIG. 1A shows a side view of the EMU 100. The EMU 100 is made up of several components such as a hard torso, arm and leg attachments, and a helmet. Systems that are affixed as part of the EMU 100 include a primary life support system (PLSS) 120 and a display and control module (DCM) 130. Together, the components of the EMU 100 create a habitable environment for a wearer performing extravehicular activity in space. As shown in FIG. 1A, an EMU power transfer unit 110 may be included in the PLSS 120 100 according to an exemplary embodiment. The EMU power transfer unit 110 includes a coil 105 that facilitates magnetic power transfer to the EMU 100 from a power transfer unit 210 (FIG. 2).

FIG. 1B shows an isometric view of the EMU 100. The DCM 130 is visible in the view shown in FIG. 1B. As indicated, a coil 105 of the EMU power transfer unit 110 may be on an outer surface of the DCM 130 rather than on the outer surface of the PLSS 120 according to the exemplary embodiment shown in FIG. 1B. The EMU power transfer unit 110 may be within the DCM 130, for example. The locations of the EMU power transfer unit 110 and the coil 105 are not limited by the illustrated examples. As long as the coil 105 is exposed to facilitate wireless power transfer, other factors such as space, wiring density, and wire routing may drive the determination of where to locate the EMU power transfer unit 110 and the coil 105 within the EMU 100. The EMU power transfer unit 110 is further detailed with reference to FIG. 4.

Figure 2:
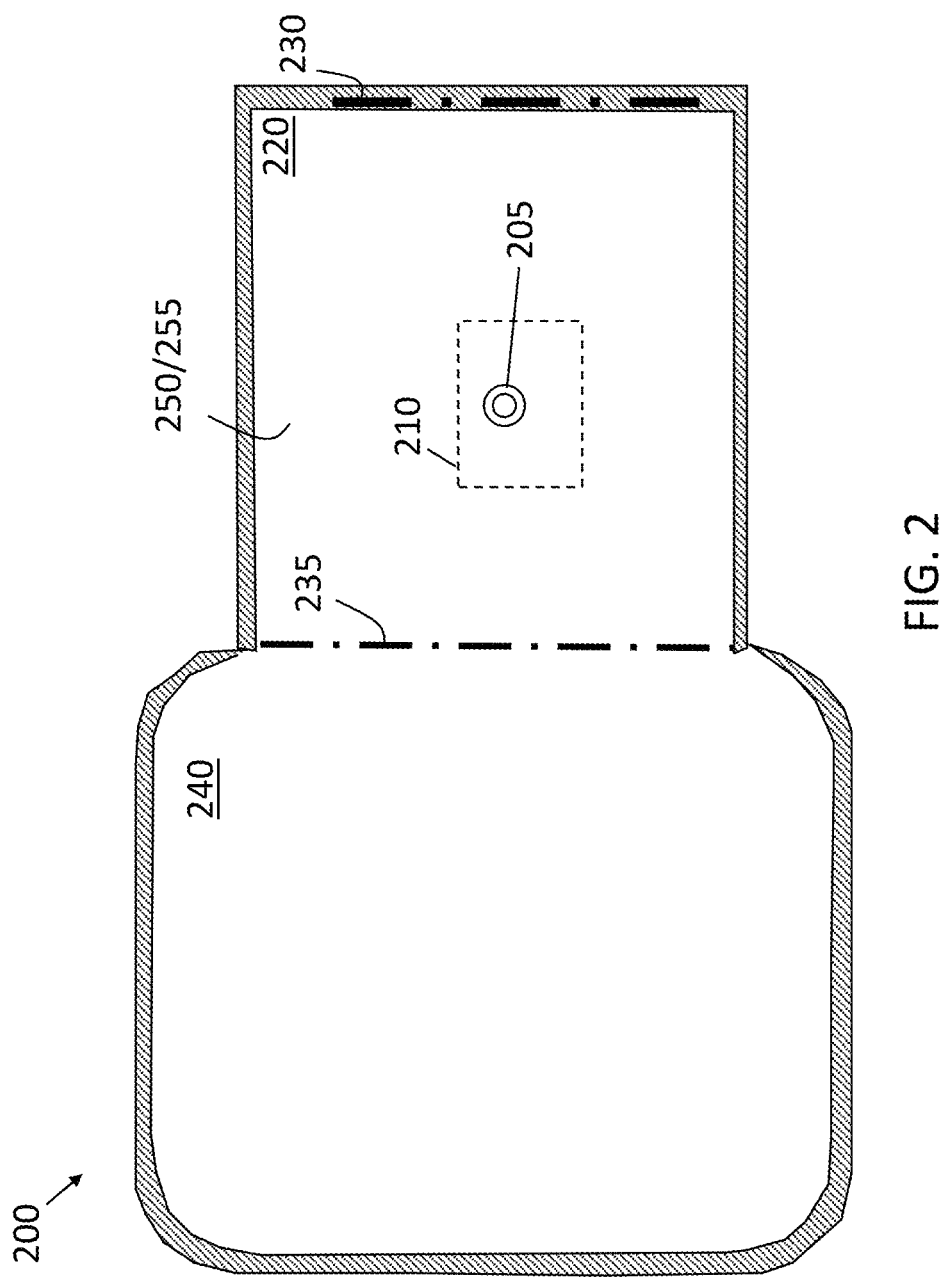
FIG. 2 shows aspects of space habitat that facilitates wireless power transfer to an EMU according to one or more embodiments.

FIG. 2 shows aspects of space habitat 200 that facilitates wireless power transfer to an EMU 100 according to one or more embodiments. The space habitat 200 may be a space vehicle, a space station, or a habitat on a planetary surface according to alternate embodiments. In each embodiment, the space habitat 200 includes an airlock 220, which is a volume between an exterior hatch 230 leading to/from space or a planetary surface and an interior hatch 235 leading to/from an interior volume 240 of the space habitat 200. The airlock 220 may include a power transfer unit 210 with a coil 205 that facilitates wireless power transfer to an EMU. The power transfer unit 210 may be mounted to a structure 250 (e.g., wall 255) within the airlock 220, as shown, and is further discussed with reference to FIG. 4.

Figure 3:
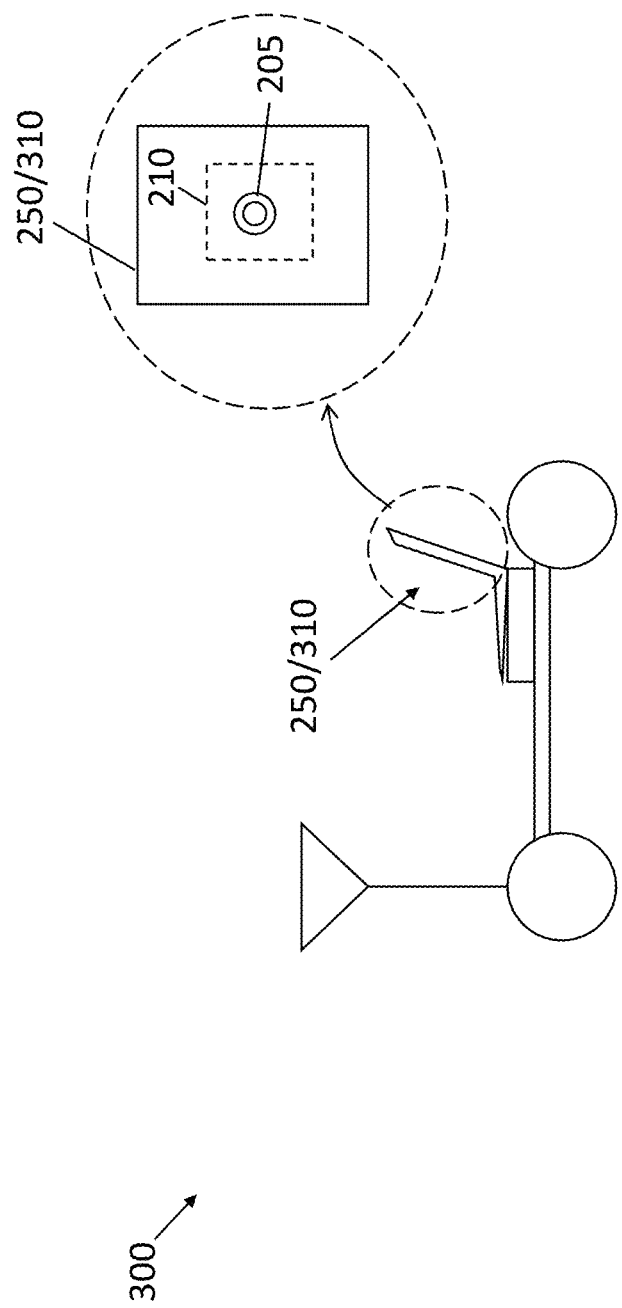
FIG. 3 shows a rover that facilitates wireless power transfer to an EMU according to one or more embodiments.

FIG. 3 shows a rover 300 that facilitates wireless power transfer to an EMU 100 according to one or more embodiments. The rover may include a seat 310 or other structure 250, as indicated. As the expanded front view of the back of the seat 310 shows, the rover 300 may include a power transfer unit 210 with a coil 205 in addition or alternately to the airlock 220. While the seat 310 is shown as the exemplary structure 250 that includes the power transfer unit 210 and coil 205 in FIG. 3, the example is not intended to limit the location of the power transfer unit 210 and coil 205 within the rover 300.

Figure 4:
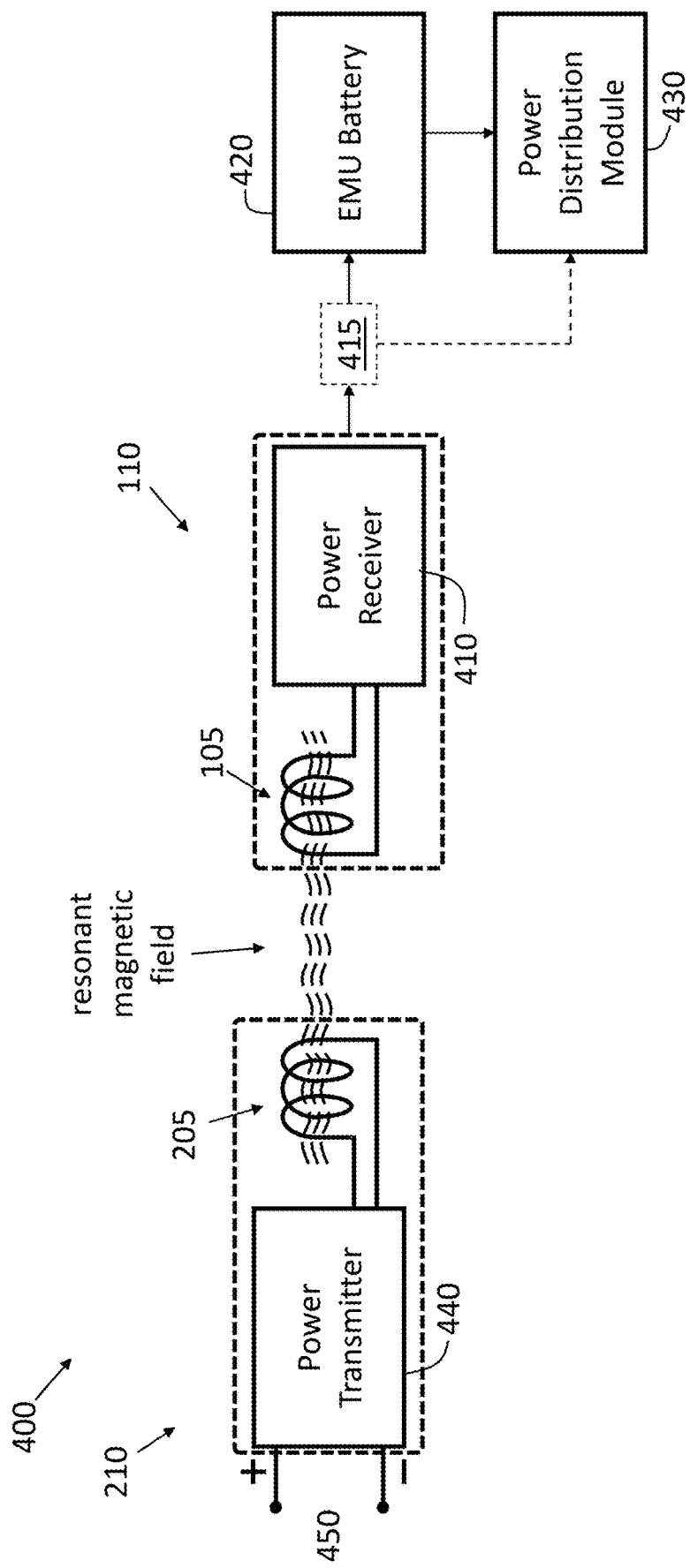
FIG. 4 is a block diagram of a system that facilitates wireless power transfer to an EMU according to one or more embodiments.

FIG. 4 is a block diagram of a wireless power transfer system 400 that facilitates wireless power transfer to an EMU 100 according to one or more embodiments. As shown, the EMU power transfer unit 110 includes the coil 105 that is mounted on a surface of the EMU 100 as shown in FIG. 1B, for example. The EMU power transfer unit 110 also includes a power receiver 410. The coil 105 of the EMU 100 is magnetically coupled to the coil 205 of the power transfer unit 210, as shown. The resonant magnetic field generated by the coil 205 is converted to a current by the coil 105. The power receiver 410 may include a rectifier and other known components that convert an alternating current (AC) resonant magnetic field into a direct current (DC) voltage for use in the EMU 100. The power receiver 410 may include known components such as a resonant tank circuit, including the coil 105, and a high frequency rectifier.

The power receiver 410 may be connected directly to an EMU battery 420 to charge the EMU battery 420 based on the power transfer from the power transfer unit 210 to the EMU power transfer unit 110. As also indicated, the EMU battery 420 may be connected to a power distribution module 430 that distributes power from the EMU battery 420 to various devices or loads in the EMU 100 (e.g., regulator, fans). As shown in FIG. 4, according to an alternate embodiment, an optional controller 415 may be included. The controller 415 may direct the DC voltage from the power receiver 410 to the EMU battery 420 for subsequent transfer to the power distribution module 430, as previously discussed. Under predefined conditions, the controller 415 may direct the DC voltage from the power receiver 410 directly to the power distribution module 430, bypassing charging of the EMU battery 420 according to this alternate embodiment.

The power transfer unit 210 includes a power transmitter 440 that is coupled to the coil 205. The power transmitter 440 may be connected to a power bus of the space habitat 200 (e.g., space vehicle, space station, planetary habitat) or rover 300, for example. The power transmitter 440 may convert DC voltage from the space habitat 200 or rover 300 into an AC resonant magnetic field using known components such as an inverter and resonant tank circuit that includes the coil 205.

Based on the wireless power transfer that is facilitated by the EMU power transfer unit 110 within the EMU 100 and the power transfer unit 210 that may be affixed to a structure 250 in an airlock 220 or on a rover 300, for example, an astronaut wearing the EMU 100 need not end the extravehicular activity and return to the interior volume 240 of a space habitat 200 when battery capacity is reaching exhaustion. As previously noted, the EMU battery 420 may have to be removed for charging according to prior approaches. This requires entering the interior volume 240 so that life support systems of the EMU 100 that require power may be shut down without endangering the astronaut. Because wireless charging does not require removal of the EMU battery 420 or shut down of the systems of the EMU 100, the charging or alternate power transfer may take place outside the interior volume 420 and extravehicular activity may be resumed with reduced interruption.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An extravehicular mobility unit (EMU) comprising:
   a resonant coil on a surface of the EMU configured to be coupled to a second resonant coil affixed to a structure via a resonant magnetic field;
   a receiver in the EMU coupled to the resonant coil and configured to provide a direct current (DC) voltage based on the resonant magnetic field;
   a battery in the EMU configured to be charged based on the DC voltage;
   a power distribution module connected to the battery and configured to distribute power to one or more systems in the EMU, one or more of the one or more systems in the EMU creating a habitable environment for a wearer of the EMU; and
   a controller connected to the receiver, the battery, and the power distribution module, wherein the controller is configured to direct the DC voltage from the receiver to the power distribution module while bypassing charging of the battery,
   a primary life support system (PLSS);
   a display and control module (DCM);
   wherein the resonant coil is affixed on an outer surface of the PLSS of the EMU and the second resonant coil is affixed on a surface of the DCM of the EMU.

2. The EMU according to claim 1, wherein the one or more systems include a regulator and one or more fans.

3. A method of assembling an extravehicular mobility unit (EMU), the method comprising:
   affixing a resonant coil on a surface of a primary life support system (PLSS) of the EMU, the resonant coil being configured to be coupled to a second resonant coil, which is affixed to a display and control module (DCM) of the EMU, via a resonant magnetic field;
   coupling a receiver in the EMU to the resonant coil and configuring the receiver to provide a direct current (DC) voltage based on the resonant magnetic field;
   configuring a battery in the EMU to be charged based on the DC voltage;
   arranging a power distribution module connected to the battery and configured to distribute power to one or more systems in the EMU, one or more of the one or more systems in the EMU creating a habitable environment for a wearer of the EMU; and
   arranging a controller connected to the receiver, the battery, and the power distribution module and configuring the controller to direct the DC voltage from the receiver to the power distribution module, bypassing charging of the battery.

4. The method according to claim 3, wherein the one or more systems include a regulator and one or more fans.

5. The method according to claim 3, further comprising affixing the resonant coil on an outer surface of the PLSS of the EMU.

6. The method according to claim 3, further comprising affixing the resonant coil on an outer surface of the DCM of the EMU.

7. A system for power transfer in space, the system comprising:
   a power transfer unit affixed to a structure, the power transfer unit comprising:
   a first resonant coil; and
   a transmitter coupled to the first resonant coil; and
   an extravehicular mobility unit (EMU), the EMU comprising:
   a second resonant coil configured to be coupled to the first resonant coil via a resonant magnetic field;
   a receiver coupled to the second resonant coil and configured to provide a direct current (DC) voltage based on the resonant magnetic field;
   a battery configured to be charged based on the DC voltage;
   a power distribution module connected to the battery and configured to distribute power to one or more systems in the EMU, one or more of the one or more systems in the EMU creating a habitable environment for a wearer of the EMU; and
   a controller connected to the receiver, the battery, and the power distribution module,
   wherein the controller is configured to direct the DC voltage from the receiver to the power distribution module while bypassing charging of the battery,
   a primary life support system (PLSS);
   a display and control module (DCM);
   wherein the first resonant coil is affixed on an outer surface of the PLSS of the EMU and the second resonant coil is affixed on an outer surface of the DCM of the EMU.

8. The system according to claim 7, wherein the one or more systems include a regulator and one or more fans.

9. The system according to claim 7, wherein the structure is in an airlock of a space vehicle, a space station, or a planetary habitat.

10. The system according to claim 7, wherein the structure is part of a planetary rover.

* * * * *